US012560016B2

(12) United States Patent
Perez et al.

(10) Patent No.: US 12,560,016 B2
(45) Date of Patent: Feb. 24, 2026

(54) SYSTEM FOR DETECTION OF THE POSITION OF THE CLOSING LEAF FOR A BARRIER DURING ITS HANDLING

(71) Applicant: FAAC S.P.A., Zola Predosa (IT)

(72) Inventors: Daniel Perez, Foothill Ranch, CA (US); Danilo Aceto, Zola Predosa (IT); Lanfranco Solmi, Bologna (IT)

(73) Assignee: FAAC S. P.A., Zola Predosa (IT)

( * ) Notice: Subject to any disclaimer, the term of this patent is extended or adjusted under 35 U.S.C. 154(b) by 390 days.

(21) Appl. No.: 17/954,729

(22) Filed: Sep. 28, 2022

(65) Prior Publication Data

US 2023/0099172 A1 Mar. 30, 2023

(30) Foreign Application Priority Data

Sep. 29, 2021 (IT) ........................ 102021000024932

(51) Int. Cl.

*E05F 15/635* (2015.01)
*E06B 11/02* (2006.01)
*E06B 11/04* (2006.01)

(52) U.S. Cl.

CPC .......... *E05F 15/635* (2015.01); *E06B 11/026* (2013.01); *E06B 11/045* (2013.01); *E05Y 2201/716* (2013.01); *E05Y 2201/722* (2013.01); *E05Y 2400/40* (2013.01); *E05Y 2400/502* (2013.01); *E05Y 2900/40* (2013.01)

(58) Field of Classification Search

None

See application file for complete search history.

(56) References Cited

U.S. PATENT DOCUMENTS

| | | | | |
|---|---|---|---|---|
| 2004/0257070 A1* | 12/2004 | Takuma | G01D 5/04 | 310/68 B |
| 2007/0271851 A1* | 11/2007 | Slopack | E05F 15/627 | 49/358 |
| 2009/0140731 A1* | 6/2009 | Miyashita | G01D 5/2451 | 310/68 B |
| 2010/0004823 A1* | 1/2010 | Nakatsu | B62D 5/008 | 701/41 |

FOREIGN PATENT DOCUMENTS

| | | |
|---|---|---|
| DE | 94 09 724 U1 | 11/1994 |
| EP | 3 290 626 B1 | 9/2020 |

OTHER PUBLICATIONS

Belloni Alberto; System for Detecting Moving Conditions of the Closing Leaf of a Barrier; FAAC SPA [IT]; EP3290626A1; Publication Mar. 7, 2018; CPC E05F15/603 (EP) (Year: 2018).*

(Continued)

*Primary Examiner* — Nasima Monsur

(74) *Attorney, Agent, or Firm* — Oblon, McClelland, Maier & Neustadt, L.L.P.

(57) ABSTRACT

A system for detecting the movement conditions of the leaf closing a barrier, the leaf being able to occlude a delimited opening or passage and in which the leaf itself is moved by a motor whose rotation shaft is associated with a motion transmission mechanism to the leaf. On the motor is present a first device for measuring the rotation of the rotation shaft, and a second measuring device is associated with a second rotation shaft being connected to the first shaft by a reduction gear with a reduction ratio that is non-integer.

8 Claims, 1 Drawing Sheet

(56) References Cited

OTHER PUBLICATIONS

Hwang Chul Hyun et al.; Apparatus for Opening and Shutting Active Air Flap; SL Corp [KR]; Publication •Jun. 23, 2016; KR101632720B1; CPC B60K11/08 (KR); F16H1/36 (KR); (Year: 2016).*

Italian Search Report issued Apr. 20, 2022 in Italian Application No. 102021000024932 filed on Sep. 29, 2021, 9 pages (with English Translation of Categories of Cited Documents & Written Opinion).

* cited by examiner

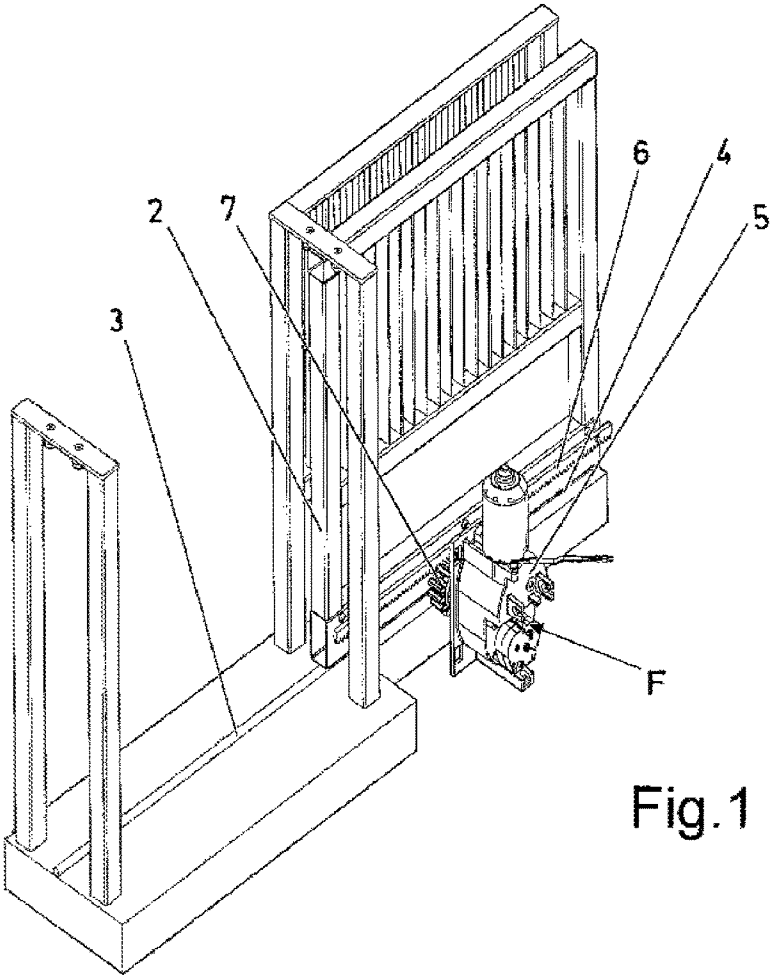
Fig.1
Fig.2
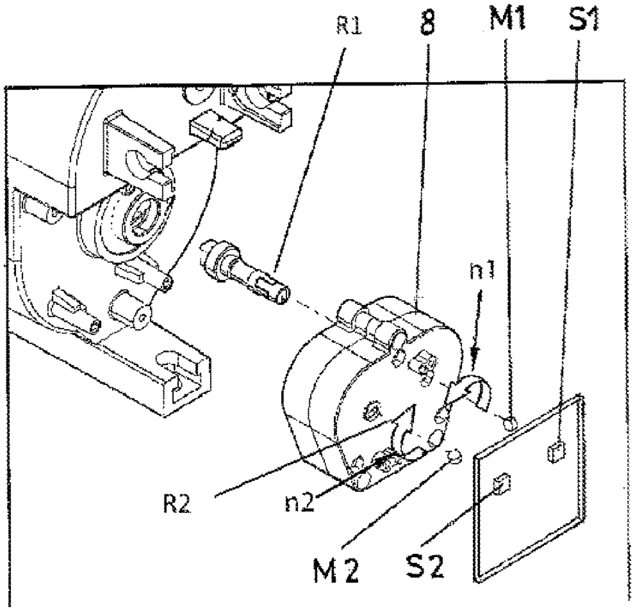

SYSTEM FOR DETECTION OF THE POSITION OF THE CLOSING LEAF FOR A BARRIER DURING ITS HANDLING

BACKGROUND OF THE INVENTION

Field of the Invention

The present invention refers to a system for detecting moving conditions of the closing leaf for a barrier. Such a barrier can for example be an automatic gate, a garage entrance, etc., more in general the system of the present invention can be applied to barriers in which access is opened and closed by at least one leaf moved automatically.

Description of the Related Art

In particular, for the purposes of the present invention the term moving conditions is meant to indicate the position of the leaf on the barrier, the forward movement speed, the detection of the open or closed end stop positions, the movement force, etc. Automatic gates for accessing private areas are usually actuated by users, from fixed stations, through opening and closing buttons or keys or by means of remote controls, which send a via radio impulse to an electronic control station, which takes care of actuating the gate in the desired direction.

Patent application US2019351926 describes a crossing gate mechanism includes a swingable gate arm, a rotatable gate arm shaft fixed to the gate arm, and an electronic sensor assembly coupled to the gate arm shaft. Rotation of the gate arm shaft corresponds with swinging of the gate arm. The electronic sensor assembly senses an angular position of the gate arm shaft and transmits a position signal corresponding thereto. The electronic sensor assembly includes a driving element that is attached to the gate arm shaft to rotate therewith. the electronic sensor assembly also includes a driven element that is driven by the driving element such that rotation of the gate arm shaft causes the driven element to rotate. The electronic sensor assembly is configured to generate the position signal based on a position of the gate arm shaft.

These types of gates, however, can become a source of serious drawbacks, in terms of the safety of the user, since, due to the intrinsic configuration of the structures, they usually comprise moving parts, which have sharp edges that are very dangerous to the well-being of the user.

Indeed, since these gates are actuated remotely from fixed stations, the movement of the structure cannot be interrupted automatically at the moment of impact of potential users or other objects against projecting portions of the aforementioned structures, in particular against the primary edge, except for by manually interrupting the power supply of the system at moments after when it is really needed.

Consequently, it is possible to imagine the inevitable and, sometimes, dramatic consequences linked to the lack of speed with which such a type of intervention can be carried out.

In order to slow down or interrupt the stroke of an automatic gate in motion, in the case of imminent danger, without needing to intervene manually, safety systems for sliding gates have been used that are substantially based on the use of protective ribs or on infrared sensors.

Such ribs are positioned at the most dangerous edges, are made of soft material and transmit an electric signal to a contact of an electronic transmitter, for example by means of pressure gauges, whenever the pressure inside them changes, for example in the case of contacts and accidental impacts caused by the vehicles during their passage.

Indeed, when an obstacle impacts the rib, the electronic transmitter immediately sends an impulse to a receiver, able to be activated through radio contact, which is positioned in the vicinity of a fixed point and that immediately takes care of interrupting the supply of electrical energy to the system; consequently, if the gate is moving, it instantly locks in the position reached. In the case of automatic sliding gates, the protective rib is mounted, through the application of a shaped profile made of aluminium, on the front advancing surface of the sliding leaf of the gate itself.

Systems using infrared rays usually comprise a plurality of infrared transmitters and receivers, the transmitted and received rays delimiting a protected area corresponding to the operative surface occupied by the gate; the interruption of one of said rays generated by the presence of an obstacle generates an alarm signal.

The presence of obstacles can also be detected by internal detection systems such as sensors of current absorbed by the motor or encoder associated with the motor itself.

These drawbacks have been obviated by means of the system proposed in the European patent EP3290626, filed in the name of the same applicant, which describes a system for detecting the movement conditions of a leaf moved by a motor whose rotation shaft is associated with a mechanism transmission of motion to this leaf. On the rotation shaft of this motor there is a first device for measuring the rotation of this shaft, and a second measuring device associated with a second rotation shaft, this second rotation shaft is connected to the first shaft by means of a reducer, which determines a predetermined reduction ratio between the two shafts. Both of these measuring devices comprise a magnet associated with the respective rotation shaft and a relative sensor adapted to intercept the variations in the magnetic field.

The first device allows to detect the position of the leaf substantially by counting the revolutions made by the crankshaft, while the second measuring device makes a more detailed reading based on the selected reduction ratio.

The applicant noted that in said patent EP3290626, in order to obtain complete and precise information on the movement of the gate, it is necessary to read the measurements of both devices, and by comparing the two measurements it is possible to obtain the exact positioning of the gate.

The applicant has observed that by appropriately choosing the reduction ratio of this reducer, it is possible to detect the positioning of the gate with a reading even of the second measuring device only, which on the basis of this reduction ratio also allows the movement of the first to be detected. tree and obtain complete information on the position of the gate.

The present invention proposes to improve the system of EP3290626 by determining a preselected reduction ratio between the first and the second measuring device.

BRIEF SUMMARY OF THE INVENTION

One aspect of the present invention concerns a system for detecting moving conditions of the closing leaf of a barrier, the leaf being moved by a motor with a rotation shaft associated with a motion transmission mechanism to the leaf, the system including a first device on the motor for measuring the rotation of the rotation shaft), and a second measuring device associated with a second rotation shaft connected to the first shaft by a reduction gear, whose reduction ratio is non-integer.

BRIEF DESCRIPTION OF THE SEVERAL VIEWS OF THE DRAWINGS

The characteristics and advantages of the system according to the present invention will become clearer from the following description, given as an example and not for limiting purposes, referring to the attached schematic drawings, in which:

FIG. 1 is a schematic view of a gate with a sliding leaf to which the system according to the present invention is applied;

FIG. 2 is an enlarged detail of the area indicated with the arrow F of FIG. 1, illustrated exploded.

DETAILED DESCRIPTION OF THE INVENTION

The system according to the present invention can be applied to a barrier having at least one sliding leaf 2 adapted to obstruct a delimited opening or gap and in which the leaf itself is moved by a motor the rotational shaft of which is associated with a mechanism for transmitting motion to such a leaf.

The example case illustrated concerns a gate having a sliding leaf 2 on a track 3 arranged at the base of the gap through wheels 4 or similar means adapted for sliding such a leaf along the gap.

A suitable motor 5 causes the movement of the leaf through the mechanism for transmitting motion to such a leaf comprising a rack 6 arranged longitudinally on the leaf and a pinion 7 keyed onto the rotational shaft R1 of such a motor.

According to the present invention a first device for measuring the rotation of such a shaft is associated on the rotational shaft R1 of such a motor. Advantageously, the system according to the present invention also comprises a second measuring device associated with at least a second rotational shaft R2. Such a second rotational shaft being connected to the first shaft through a reduction gear mechanism 8, which causes a predetermined reduction ratio thereof.

Said reduction gear can comprise a plurality of gears each mounted on a corresponding shaft. According to the present invention, further rotation sensors may be present on at least one of shafts of the reduction gear mechanism. In this way it is possible to improve the resolution of the measurements made by the sensors In practice, these measuring devices operate substantially as encoders and can be made in an equivalent way with technologies of the resistive, capacitive optical or magnetic type.

Both the first measuring device and the second are preferably made by means of magnets M1 and M2 which rotate together with the respective shafts. The rotation signal of the magnets can be intercepted by as many magnetic field sensors S1 and S2.

In an alternative embodiment the first device R1 is in the motor which is provided with its own rotational measuring device as a typical encoder or motor rotation sensor than can internally increment and decrements the counts increasing the accuracy of the position of the gate. Therefore only the second shaft is provided with a specific rotational measuring device because the rotation on the first shaft is directly provided by the motor. Typically, a brushless magnet sensor in a BLDC motor can be used.

Such devices measure the angular position (n1, n2) of the rotating magnets. Each rotation of the shaft corresponds to a predetermined linear displacement of the door. Therefore, by measuring the angular position, the position of the door can be determined at any time. In addition, the first device being keyed directly on the shaft of the motor that moves the leaf is also able to measure the effort, the speed or the torque imparted by the motor to move the leaf. Therefore, in the event that there are variations in said stress, for example due to the presence of an obstacle on the barrier, the measuring device is able to detect it.

Clearly, the two measuring devices can be connected to a control unit for the movement of the leaf, or of the gate in general, which can manage the movement of that leaf by evaluating the measurements made.

Advantageously, the device made using magnets has the advantage that both magnets and the reducer can be isolated inside a special container, while the detection can be carried out from the outside by placing sensors S1 and S2 outside this container.

The meaning of the double device is to allow the first to detect the position of the leaf by substantially counting the revolutions made by the crankshaft, while the second measuring device makes a more detailed reading based on the reduction ratio.

This reduction ratio, according to the present invention, is a non-integer ratio between the two shafts, so as to obtain a periodicity that in the instant in which there is a complete revolution of the second rotation shaft R2 (or of the first R1) the first shaft R1 (or of the second shaft R2) has not made an integer number of revolutions and therefore is slightly out of phase with respect to an integer value. This offset angle between the first shaft and the second shaft also provides information on the number of rotations performed by the first shaft (or second shaft). In fact, the phase shift will increase as the number of laps performed increases. In practice, when one of the two rotation shafts (R1 or R2) carries out an entire number of revolutions, the other shaft, due to the effect of the non-linear reduction ratio, carries out a predetermined number of revolutions plus (or less) a phase shift angle. This angle carries with it or contains an indication of how many turns the other shaft (R2 or R1) has made.

When the phase shift angle is measured in revolutions, its decimal part indicates the number of revolutions made by the shaft that performed the whole rotations.

EXAMPLE OF APPLICATION

The following table shows the rotations performed by the first shaft and those performed by the second shaft with a reduction ratio of 2.1.

| Number of laps R1 | Number of laps R2 |
|---|---|
| 0.0 | 0.0 |
| 2.1 | 1.0 |
| 4.2 | 2.0 |
| 6.3 | 3.0 |
| 8.4 | 4.0 |
| 10.5 | 5.0 |
| 12.6 | 6.0 |
| 14.7 | 7.0 |
| 16.8 | 8.0 |
| 18.9 | 9.0 |
| 21.0 | 10.0 |

When the second shaft makes one revolution, the first shaft makes 2.1 revolutions, which causes a phase shift of 0.1 revolutions between the two at this point. The decimal part of the phase shift (i.e. 1) also corresponds to the number of revolutions made by the second shaft.

Furthermore, when the second shaft makes four turns, the first shaft makes 8.4 turns, which causes a phase shift of 0.4 turns between the two at this point. The decimal part of the phase shift (i.e. 4) also corresponds to the number of revolutions made by the second shaft.

In this way, in the event that the signal received by the sensor of the second shaft is lost, for example due to a power cut, by visually evaluating the phase shift between the first and second shaft, it is possible to retrieve the information also on the number of revolutions performed from the first shaft and therefore, in general, what was the movement of the leaf.

An advantage of the fact of making a magnetic detection or measurement device is that the detection of the rotation and therefore the determination of the position of the door can be carried out even in a situation of absence of power supply. For example, in a situation where the gate is unlocked due to a motor failure and moved manually, the reading of the position takes place anyway.

The combination of the two measurements determines a precise detection of the stroke and position of the door. Therefore, this system can be used to determine the stroke of the leaf and therefore to establish the limit switch positions. As an alternative embodiment the system can also be used as a movement control device in general, for example to control the speed and reduce the speed itself near the limit switch positions, and also as an anti-crushing device.

Two examples of embodiments using two sensors Sa and Sb and with non-integer reduction ratios are reported below. In the following:

- A is the low speed shaft.
- B is the high speed shaft directly connected to the pinion of the motor.
- Ra are the revolutions of A.
- Rb are the revolutions of B (that is the position of the gate).
- RR is the reduction ratio Rb/Ra.
- Sa is the value of angular sensor on A (1=360°).
- Sb is the value of angular sensor on B (1=360°).
- P is the period of the system, that is the maximum range of Rb, after that both sensors return to the initial positions.

Furthermore:

- [n] is the integer part of the number n.
- {n} is the fractional part of the number n.

The sensors measure the fractional part of the total rotation R.

$Sb=\{Rb\}=\{Ra\times RR\}$

Since $Ra=[Ra]+\{Ra\}=[Ra]+Sa$ $Sb=\{Ra\times RR\}=\{([Ra]+Sa)\times RR\}=\{[Ra]\times RR+Sa\times RR\}$ Since $RR=[RR]+\{RR\}$ $Sb=\{[Ra]\times[RR]+[Ra]\times\{RR\}+Sa\times RR\}$ Since $[Ra]\times[RR]$ is an integer number it's not relevant on the fractional value.

$$Sb=\{[Ra]\times\{RR\}+Sa\times RR\}(Eq.1).$$

First Example

In said example, the fractional part of the reduction ratio is not zero, but 1 is divisible by it, that is $1/\{RR\}=K$ integer, for each revolution of the shaft A, Sb increase of the fractional part of the reduction ratio.

The Period of the System is:

$P=RR\times K=RR/\{RR\}$

Therefore, the maximum range is K times the range of case 1.

In a period there are K revolutions of the shaft A.

Measuring Sa and Sb, it's possible to calculate [Ra] by Eq. 1.

Then the Position of the Gate is:

$Rb=Ra\times RR=(Sa+[Ra])\times RR$

Here the sensor B can used just to calculate [Ra], but, Sb can be used to achieve a better resolution adjusting the Rb value calculated by Sa with the previous equation.

Second Example

In said example the fractional part of the reduction ratio is not zero, and 1 is not divisible by {RR}, that is 1/{RR} is not an integer, but $1/\{RR\}=K+k$, where K is the integer part and k is the fractional part.

The period is $P=RR\times 10^n$ where n is the number of decimal digits of RR.

In this case, only in the first K revolutions of A the increase of Sb is constant:

$DSb=\{RR\}$.

From the revolution K to the revolution K+1 there is a roll over of Sa and $Dsb=(\{RR\}\times K)-1$.

This happens every K revolutions of A.

In this Case the Period is $P=RR\times K=RR\times[1/\{RR\}]$.

The invention claimed is:

1. A system for detecting movement conditions of a leaf closing a barrier, the leaf being able to occlude a delimited opening or passage and in which the leaf is moved by a motor having a first rotation shaft is associated with a motion transmission mechanism to the leaf, the system comprising:

a first measuring device provided on the motor, the first measuring device configured to measure rotation of said first rotation shaft, and a second measuring device associated with a second rotation shaft, said second rotation shaft being connected to the first rotation shaft by a reduction gear having a reduction ratio that is non-integer, wherein when one of the first and second rotation shafts performs an integer number of revolutions, the other of the first and second rotation shafts performs a predetermined number of revolutions plus or minus a phase shift angle due to an effect of the non-integer reduction ratio, the phase shift angle containing an indication of how many integer number of revolutions the one of the first and second rotation shafts has performed, and wherein, when the phase shift angle is measured in revolutions, a decimal part of the phase shift angle indicates the integer number of revolutions made by the one of the first and second rotation shafts.

2. The system according to claim 1, wherein the first and second measuring devices are magnetic, capacitive, optical, or resistive.

3. The system according to claim 2, wherein each of the first and second measuring devices includes a magnet associated with the first and second rotation shafts, respectively, and a sensor adapted to intercept variations in a magnetic field.

4. The system according to claim 1, wherein said leaf is a leaf of a gate sliding on a track placed at a base of the passage, the motor determines the movement of the leaf by the motion transmission mechanism comprising a rack arranged longitudinally on the leaf and a pinion keyed on the first rotation shaft of the motor.

5. The system according to claim 3, wherein the magnets and the reduction gear are placed inside a container, and the sensors are disposed outside the container.

6. The system according to claim 1, wherein said first and second measuring devices are connected to a door movement control unit that can manage movement of a door based on the measurements.

7. The system according to claim 1, wherein the first rotational shaft is provided directly on the motor.

8. The system according to claim 1, wherein said reduction gear comprises a plurality of gears each mounted on a corresponding shaft.

* * * * *